Dec. 23, 1969  P. RHEINBERGER  3,485,997
PROCESS AND APPARATUS FOR THE THERMAL VAPORIZATION OF
MIXTURES OF SUBSTANCES IN A VACUUM
Filed Nov. 25, 1966  2 Sheets-Sheet 1

INVENTOR.
Peter Rheinberger by McGlew & Toren
ATTORNEYS.

Dec. 23, 1969  P. RHEINBERGER  3,485,997
PROCESS AND APPARATUS FOR THE THERMAL VAPORIZATION OF
MIXTURES OF SUBSTANCES IN A VACUUM
Filed Nov. 25, 1966  2 Sheets-Sheet 2

INVENTOR.
Peter Rheinberger by McGlew & Toren
ATTORNEYS

United States Patent Office 3,485,997
Patented Dec. 23, 1969

3,485,997
PROCESS AND APPARATUS FOR THE THERMAL VAPORIZATION OF MIXTURES OF SUBSTANCES IN A VACUUM
Peter Rheinberger, Vaduz, Liechtenstein, assignor to Balzers Patent-Und Lizenz-Anstalt, Balzers, Liechtenstein
Filed Nov. 25, 1966, Ser. No. 596,947
Claims priority, application Switzerland, Nov. 26, 1965, 16,374/65
Int. Cl. B23k 9/00
U.S. Cl. 219—121
11 Claims

ABSTRACT OF THE DISCLOSURE

The evaporation of a powdered mixture of a plurality of components is carried out in a manner such that the ratio of the various components of the mixture in the vapor which is formed is the same as in the original powdered mixture. In order to accomplish this the powder is spread in the form of a band which is evaporated continuously and completely (quantitatively) over its entire width. Thus if there is any material left which has not evaporated there is less risk that the easiest evaporating components will not be present to the same extent as they were in the original powdered mixture.

An apparatus for carrying out the method includes a support having a ribbon-like supporting area with a gutter defined on each side thereof and an energy ray member which may be directed to cover the entire width of the ribbon support area as it moves along to provide the evaporation. The gutters on each side permit the falling down of the material which is not evaporated so that all of the components will still be present in this material which flows to the gutter.

SUMMARY OF THE INVENTION

The evaporation of a mixture of substances is much more difficult to carry out than the evaporation of a uniform substance of a single material. Although various proposals for the solution of the problem have become known in the literature, there is thus far no device that satisfies the practical requirements for carrying out such evaporation. The great difficulties arise mainly from the fact that the various components of a mixture usually have entirely different vapor pressures and therefore evaporate at different rates at a given evaporation temperature. The result of this is that any melt consisting of several vaporizable components tends to segregate, that is, to form a variation of its composition in that the volatile components evaporate first. Accordingly, the condensations to be produced for example, vapor deposition layers will have a composition different from that desired.

The process according to the present invention uses for the thermal evaporation of substance mixtures an energy transmitting ray such as a laser or maser. Such rays have the advantage that the energy required for the evaporation can be transmitted directly onto the substances to be evaporated. At sufficient absorption capacity thereof, the transmitted radiation energy is even absorbed directly at the surface, that is, precisely where it is needed as the heat of evaporation. When heated by radiation, the evaporating material assumes a higher temperature than the support and in addition the support may be cooled if desired. Thereby, evaporation of the support itself, that is, the crucible or the evaporator vessel can be avoided and especially any chemical reactions between the support and the substances to be evaporated which would lead to the destruction of the support and to impure condensations. Charge carrier rays for energy sources for evaporation purposes have been in use and in recent years there have been added as radiation sources also the molecular oscillators known as lasers and masers.

Rays as energy sources for thermal evaporation have the further advantage that it is possible to concentrate the available energy on a small area by known focusing means such as electron and ion lenses for corpuscular rays, optical lenses for lasers, etc. It is therefore possible to obtain a very high evaporation temperature at relatively low expenditure of energy. Focused rays, however, have the disadvantage that they very easily lead to irregular angular distribution of the vapor stream produced. This is so because at the point of impingement of the ray, local evaporation immediately forms a crater in the substance to be evaporated and this prevents the uniform spreading of the vapor. Thus, there results an uneven thickness of the condensed layers. For these reasons, electron ray evaporation devices have been used only for those applications where a uniform thickness of the condensation is not very important such as for the production of condenser coatings. Because of the danger of segregation, only homogeneous substances could be evaporated practically. For the production of condensations where the composition of the layers produced as well as their thicknesses must be maintained and within very strictly specified limits, such as with optical applications (interference layers), heating by means of electron rays has not been too successful. The process according to the invention overcomes the difficulties of segregation and distribution particularly in the case of the evaporation of mixtures which are available as starting substances only in broken form such as powders as is frequently the case especially with non-metallic substances.

In accordance with the invention, there is provided an apparatus which may be employed particularly for conducting chemical reactions which are to be started and kept going by an electron ray. Such an apparatus employs a circular base having a gutter on at least one side which is rotatable about a vertical axis and which forms a reaction vessel. The reaction products are supported on the base above the gutter so that the portions thereof which partially evaporate to the heat of reaction and the residues are continuously removed from the gutter by a scraper. The fresh materials to be reacted are supplied to the support for the material above the gutter as the apparatus is rotated or moved.

In the so-called flash evaporation, the substance mixture to be evaporated is continuously supplied to a fixed evaporation surface. The evaporation surface must have a temperature high enough so that all components of the applied mixture evaporate immediately so that there is no possibility of segregation. This known process is very difficult to handle in practice because the replenishment of the mixture is hindered by the vaporizing from the evaporation surface and much of the evaporating material, especially in powder form which gets into the rising vapor stream from above through a gutter or similar arrangement, is blown away by the vaporizing substance and does not undergo the evaporation at all. This effect is particularly disturbing when, for instance, because of different grain sizes or form, or because of different specific gravity, one mixture component is blown away faster than the other. It has been proposed to carry out the so-called flash evaporation intermittently, that is, to apply only a small portion of the evaporating material on the evaporating dish each time, then to evaporate it completely and only then to apply the next portion. In either case, whether operating continuously and accepting the fact that part of the material becomes blown away or when operating intermittently, the known evaporation process is very time consuming.

As experience indicates, the described blowing occurs especially in a high degree when the evaporation is to be carried out by means of an energy transmitting ray. This may be attributed in part to the fact that the particles of the evaporating material which get into the ray begin to evaporate when they are in flight. If this evaporation occurs as soon as such a particle has reached the limit of the ray and begins first on the side facing this ray limit it is driven away from the ray by repulsion. When using electric charge carrier rays additional effects due to the electrostatic charge may occur.

Surprisingly, these difficulties are completely overcome by the invention and the process according to the invention permits a very high rate of evaporation limited practically only to the energy supply. In accordance with the process of the invention the thermal evaporation of substance mixtures is carried out in a vacuum by means of an energy transmitting ray by spreading the mixture to be evaporated on a support in a thin layer and effecting the evaporation from the individual points of the support successively by relative movement between the support and the ray.

An object of the invention is to provide a process of thermally evaporating a substance mixture in a vacuum using an energy transmitting ray comprising spreading the material in a thin layer on a support and carrying out the evaporation by a relative movement between the support and the ray and in some instances heating the substance mixture in order to provide for pre-degassing and pre-heating thereof.

A further object of the invention is to provide a device for the evaporation of mixture substances which includes a support which is movable and which provides means for spreading a thin layer of a substance mixture thereon as it is moved and which includes means mounting a laser so that it would overlie the area at which the substance is deposited as it is moved to cause the evaporation of the material thereon.

A further object of the invention is to provide a process which is simple to execute and provides very satisfactory results in the even evaporation of a substance mixture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWING VIEWS

DETAILED DESCRIPTION

Figure 1:
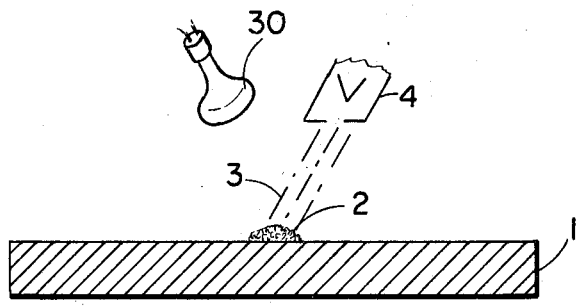
FIG. 1 is a sectional view of a support with the material thereon which is movable relative to the energy ray in accordance with the process of the invention.

Referring to the drawings in particular, the invention embodied therein comprises in FIG. 1 a plate-type support 1 for a mixture or substance mixture 2, for example of a pulverulent substance such as the components of an alloy to be evaporated. An energy ray producing device 4 is oriented above the support so as to direct the energy transmitting ray 3 against the substance mixture 2. The ray 3 impinges on a certain point of the support and causes the mixture components to evaporate at such locations. In accordance with the invention process, the impingement point of the ray on the support is continually varied either by movement of the support relative to the ray or vice versa. The mixture of the substance to be evaporated must be applied on the support in so thin a layer that practically immediately evaporation on the particular impingement point of the ray will be ensured and therefore no possibility will exist that one or the other component is given a preferential evaporation so that a condensation of different compositions is formed or the above-mentioned faults or distribution occurs due to crater formation. The ray is guided on the support in any preselected path, for example, it may be arranged to scan the support like the lines of a television picture or describe a meander path through the substance material 2.

It is preferable to apply the substance material 2 in the form of a narrow ribbon and to effect evaporation from one end of the ribbon quantitatively and simultaneously on the entire width of the ribbon. This is achieved by using a ray of corersponding diameter or a ribbon-shaped ray if the ray width is at least equal to or greater than the width of the ribbon substances to be evaporated. A ray of smaller cross section may be periodically deflected at adequate frequency crosswise to the direction of advance of the ribbon of the substance to be evaporated in order to achieve substantially the same results. Suitable means (not shown) are provided for the production and deflection of the ray. Instead of the ray deflection in the sense of a relative movement, of course, the support may be moved with mechanical devices at the same time as the ray is advanced.

With a process carried out in accordance with the invention in which the evaporation takes place along the complete width of the ribbon or over an area backwardly and forwardly across and then along the length of the ribbon, it has been found that there will be very little difficulties due to the blowing away of the evaporating material. The explanation of this is presumably that between a particular point of impingement of the ray, where the evaporating material evaporates instantaneously and the still pulverulent part of the evaporating material which enters the active zone of the ray immediately thereafter there is formed a liquid rampart or wall which adheres firmly on the support and therefore cannot be blown away. This rampart protects the material behind it from being blown away by the vapor stream.

In some instances, it is desirable to heat the substance 2 with a heater 30 before the evaporation thereof by the energy ray producing device 4.

Figure 2:
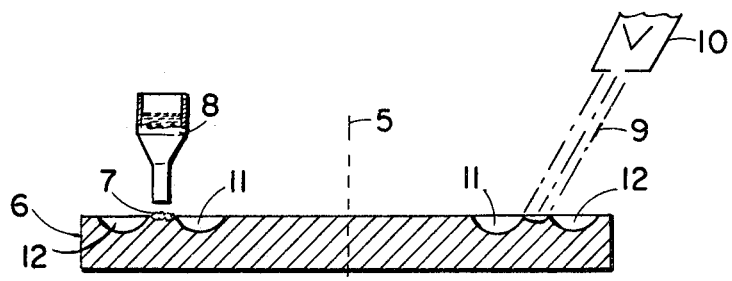
FIG. 2 is a sectional view of a support disk which is rotatable relative to the energy ray and to the material supply means in accordance with another embodiment of the invention.

In FIG. 2 there is shown a disk 6 which is rotatable about a vertical axis 5. The disk 6 provides a support for the substance mixture to be evaporated which is applied at the point 7 continuously in a thin laye rin the form of a narrow ribbon by means of a feed device 8. As the disk is rotated, the material which is applied to the disk support 6 is passed under the electron ray 9 from an electron gun 10 by the rotation of the disk. The applied quantity of evaporating material is so small that a substantially complete instantaneous evaporation at the impingement point of the ray 9 is brought about.

A feature of the construction of the device of FIG. 2 is that the annular supporting zone 7 leads on each side into respective depressions 11 and 12 which provide a collecting trough for the flow of any unevaporated parts of the substance mixture. These unevaporated parts may become liquid during the heating by the electronic ray and they will flow off to one side or the other in order to thus remove them from further action of the electron ray during the next passage after a full revolution of the disk 6 about the axis 5. This measure is advantageous because if the parts on each side of the ray path are not removed, they will be heated insufficiently and therefore complete evaporation would not take place but only a selective one or more volatile components of the substance mixture will evaporate. In this manner, the composition of the condensation might be disturbed. Thus, the apparatus of FIG. 2 provides means for insuring that the substance mixture will all be evaporated or the portions thereof which do not will be removed from the evaporation zone.

Figure 3:
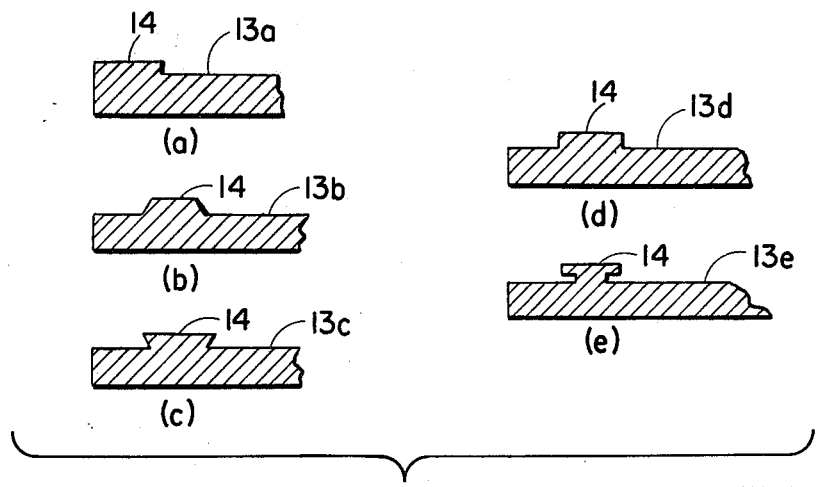
FIGS. 3a to 3e indicate partial sectional views of support elements which may be used for the process of the invention.

In FIGS. 3a-3e there are shown various modifications of a support 13a, 13b, 13c, 13d and 13e. The supports indicated are provided with the profile shown in order to provide evaporation support areas 14. The supporting elements 13a, 13b, etc. may be, for example, disks or other movable parts which may be advanced relatively to an energy ray. The support constructions are such that any portions of the mixture placed thereon which do not evaporate when exposed to the energy ray will fall off to either side of the support. In this manner, the substance mixture is to be evaporated either continuously introduced into the ray or it is removed completely from the field of operation of the ray. The movement of the ray can be brought about either by mechanical rotation or following of the ray source or in the case of the electron guns by electron optical deflection. In the embodiment of FIG. 3a, the support 13 does not have any margin exterior of the support portion 14. The strip may, if necessary, be cooled at an impingement point of the ray through a cooling body in order to protect against overheating. An almost quantitative evaporation on a cooled support by means of electron rays is possible without producing an attack of the ray on the support.

Although it has been mentioned that the substance mixture may be a pulverent mixture, the invention may also be applied not only in the case of powders but wherever it is possible to spread the substance mixture on the support so that a thin layer of the material may be exposed to the energy ray at the selected ray intensity. The velocity of the movement between the ray and the support will be such that substantially immediate evaporation occurs.

Figure 4:
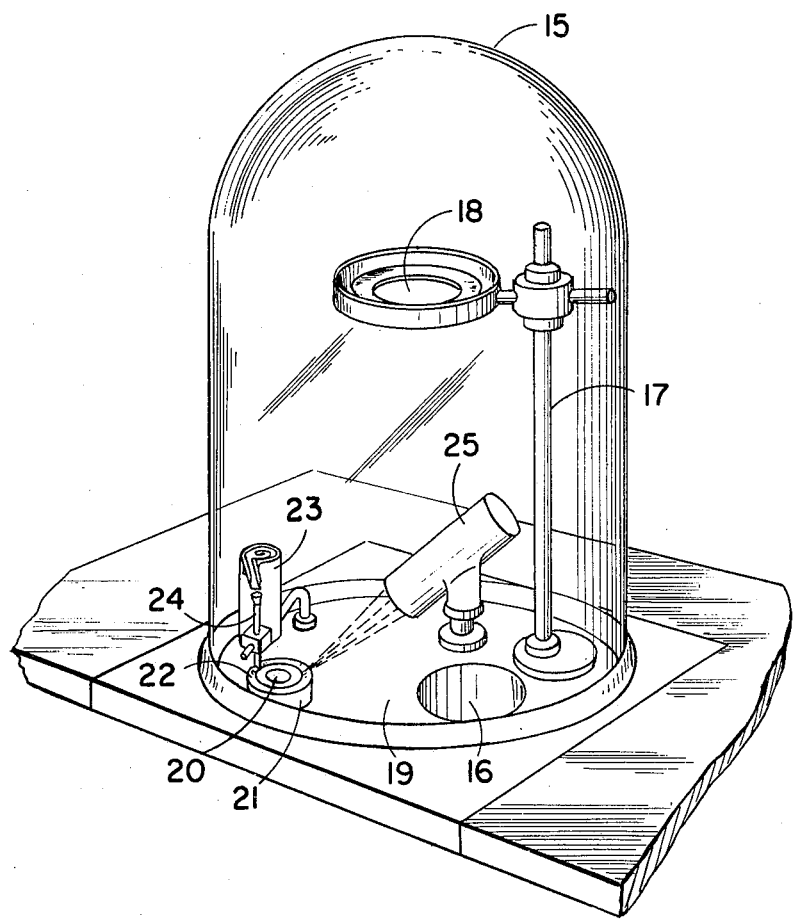

An example of the complete operation carried out in accordance with the invention is set forth as follows:

In FIG. 4, 15 indicates the recipient of a vacuum coating plant formed as a glass bell, wherefrom the air can be pumped-out to a pressure of 5.10$^{-4}$ Torr (mm. Hg) via the lead 16. Within the recipient 15 the substrate to be coated, i.e. a lens 18, is mounted on a support 17. The distance between the substrate and the evaporation source amounts to about 14 inches. A driving shaft 20 leads through the bottom 19 of the recipient and carries the disk 21. This disk has an annular evaporation zone 22 (corresponding to area 7 in FIG. 2 or 14 in FIG. 3). The pulverized material to be evaporated is continuously supplied on this zone out of feed device 23 via funnel 24.

In the coating plant there is also an electron gun 25 which is adjusted in such a manner that its beam heats a specific spot of the zone 22 so that the coating material as it is moved underneath the beam by rotating the disk 21 will be evaporated. The vapour spreads in the form of vapour jets in the recipient and produces on lens 18 the desired deposit.

In order to get i.e. an absorbing coating on lens 18 for a sun-glass a coating material is used which consists of a mixture of 75 weight percent $SiO_2$ and 25 weight percent molybdenum, both pulverized. These two pulverized components are thoroughly mixed and sieved in order to obtain a powder mixture with a uniform grain size of about 0.01 to 0.02 inch.

In the example in question the evaporation is carried out in such a manner that a power of about 3 kw. is applied with the electron beam to the prefixed point of the annular evaporation zone 22 of disk 21 at a vacuum pressure of about 5.10$^{-4}$ torr (mm. Hg); i.e. an electron beam of 1 A. amperage at 3 kv. acceleration voltage can be used. At the same time the disk is brought to a uniform rotation of about 3 turns per minute, and the pulverized mixture to be evaporated is uniformly distributed on the zone 22 by the feeding means 23 at a rate of 0.7 gram per minute. The powder mixture which is continuously moved by the rotating disk 21 into the electron beam is instantaneously evaporated and produces a deposit on substance 18 which gets thicker, the longer the evaporation is continued. At the aforementioned evaporation rate of 0.7 gram per minute one gets a deposit of about 75 percent light absorption in 250 seconds when using the named mixture, which is appropriate for sun-glass lenses. For the example in question the evaporation temperature which is produced with 3 kw. heat capacity on the evaporation spot amounts to about 2500° C. (centigrade).

If other substances are to be evaporated, other temperatures must be chosen. The necessary evaporation temperatures for the various substances are of course known to the specialist; on the other hand one can easily determine by preliminary tests which heating power must be applied in order to obtain the desired evaporation.

While a specific embodiment of the invention has been shown and described in detail to illustrate the application of the inventive principles, it will be understood that the invention may be embodied otherwise without departing from such principles.

The embodiments of the invention in which an exclusive property or privilege is claimed are defined as follows:

1. A process for the thermal evaporation of a powdered mixture of various components in a vacuum by means of an energy transmitting ray to provide a vapor with components in the same ratio as in the original powdered mixture comprising, spreading the powdered mixture in a thin layer along a support onto a ribbon-like annular supporting area having an annular gutter on each side of the supporting area and moving the support and the energy transmitting ray relatively to each other to cause the ray to move over the substance mixture to effect substantially the immediate instantaneous evaporation of a spot area of the mixture as the movement is carried out and to cause the components of the powdered mixture which are not evaporated to flow off into the gutters and be subsequently removed.

2. A process according to claim 1, wherein the substance mixture is applied on a support in the form of a narrow ribbon and evaporation is carried out from one end of the ribbon continuously and completely quantitatively over the entire ribbon width.

3. A process according to claim 1, wherein the evaporation of the substance mixture is carried out intermittently using an electron ray.

4. A process according to claim 1, including using an additional heat source to pre-heat and pre-degas the substance mixture to be evaporated before it is subjected to the energy ray.

5. A device for use in the evaporation of a powdered substance mixture of a plurality of components comprising a support with a ribbon-like annular supporting area having an annular gutter on each side thereof, means mounting an energy ray member adjacent said support for directing a ray downwardly onto said support at one spot of the ribbon-like area for the substance mixture, means for moving said support and said energy ray transmitter relatively for successively exposing all of the ribbon-like area to the energy rays and to cause the simultaneous evaporation of all of the components of at least a major portion of the substance mixture thereon and flowing off of the portions of the mixture with the same proportions of the components which does not evaporate into the gutters on each side thereof, and means for continuously feeding a substance mixture onto the ribbon-like area of said support and for moving said support to present the entire width of the area which has been filled with material to be exposed to the energy ray.

6. A device according to claim 5, wherein said support is mounted for rotation, said ribbon-like annular supporting area being an annular area defined around the center of rotation, said means for feeding said material being located directly above said plate to feed the material over the area and said ray being located to intercept the annular area at a location remote from said feeding means.

7. A device according to claim 5, wherein said support includes a raised end portion for receiving the substance mixture.

8. A device according to claim 5, wherein said support includes a raised intermediate portion having downwardly sloping side edges for supporting the substance mixture.

9. An apparatus according to claim 5, wherein said support includes a raised intermediate portion for supporting the substance mixture which includes inwardly and downwardly sloping side wall portions.

10. A device according to claim 5, wherein said intermediate support includes a raised intermediate portion having substantially vertical side walls on each side thereof.

11. A device according to claim 5, wherein said support includes a raised intermediate portion having notched areas therebeneath on each side thereof.

References Cited

UNITED STATES PATENTS

| | | | |
|---|---|---|---|
| 2,423,729 | 7/1947 | Ruhle | 219—121 |
| 2,746,420 | 5/1956 | Steigerwald | 219—121 |
| 2,771,568 | 11/1956 | Steigerwald | 219—121 |
| 3,135,855 | 6/1964 | Barber | 219—121 |
| 3,162,767 | 12/1964 | DiCurcio et al. | 219—121 |
| 3,205,087 | 9/1965 | Allen | 219—121 |
| 3,250,842 | 5/1966 | Hikido | 219—121 |
| 3,267,015 | 8/1966 | Morley | 219—121 |
| 3,303,319 | 2/1967 | Steigerwald | 219—121 |
| 3,340,601 | 9/1967 | Garibotti | 219—121 |
| 3,347,701 | 10/1967 | Yamagishi et al. | 219—121 |

JOSEPH V. TRUHE, Primary Examiner

W. D. BROOKS, Assistant Examiner

U.S. Cl. X.R.

117—93.3; 219—137